G. A. BURNHAM.
PROTECTING ELECTRIC MOTORS.
APPLICATION FILED MAR. 30, 1911.
1,063,179.
Patented June 3, 1913.
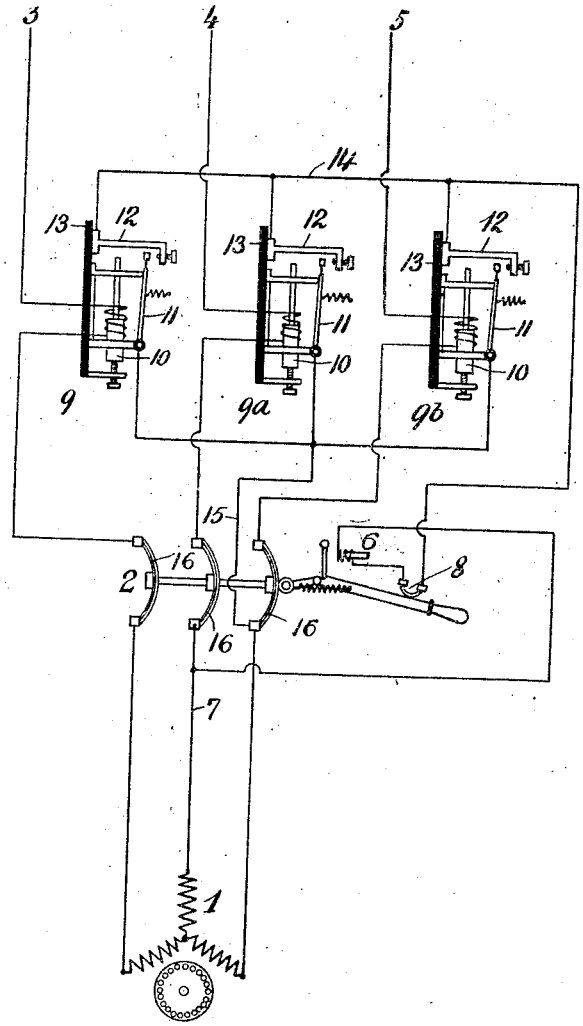
Witnesses:
Ivan Konigsberg.
Edmund O. Dubocq
George A. Burnham
Inventor
By his Attorneys
Edwards, Sager & Wooster

UNITED STATES PATENT OFFICE.

GEORGE AUGUSTUS BURNHAM, OF CLIFTONDALE, MASSACHUSETTS, ASSIGNOR TO SEARS B. CONDIT, JR., OF BROOKLINE, MASSACHUSETTS.

PROTECTING ELECTRIC MOTORS.

1,063,179. Specification of Letters Patent. Patented June 3, 1913.

Application filed March 30, 1911. Serial No. 617,806.

*To all whom it may concern:*

Be it known that I, GEORGE A. BURNHAM, a citizen of the United States, residing at Cliftondale, in the county of Essex and State of Massachusetts, have invented certain new and useful Improvements in Protecting Electric Motors, of which the following is a full, clear, and exact specification.

This invention relates to the protection of counter electromotive devices. Apparatus of this kind, when cut into an electric circuit, takes excessive current. To this class belongs electric motors which, when thrown into a circuit, draw such heavy current as often to damage the windings, particularly on starting under heavy load, unless special protective starting devices are employed. The heavy starting current of such devices is also troublesome in tripping the automatic circuit breakers commonly employed to open the circuit under dangerous running conditions. The circuit breakers are set at a point of calibration where the trip coil will operate on a certain definite overload and the low impedance of the armature often permits flow of current exceeding the tripping point, and thus causes the circuit to be broken when unnecessary, since the motor will withstand an excessive overload for a brief starting period. Motors are therefore usually provided with rheostats or other apparatus to reduce the current at the moment when they are starting until the motor acquires a sufficiently high speed to "set up" a substantial counter electromotive force to the line potential. These objections apply to both direct and alternating current motors.

It is the object of my invention to provide not only for the starting of motors by inexpensive apparatus but also to protect it against overload and underload conditions in the circuit, or open phase conditions in an alternating current circuit, so that on abnormal load variations the motor will be automatically cut out of the circuit.

My invention is particularly adapted for use with alternating current motors, but may also be applied to direct current motors, and to counter electromotive devices in general where the normal operating current is much smaller than the current following a closure of the circuit. I secure protection for the motor by employing a combined overload and underload relay controlling a trip coil of the circuit breaker which cuts the motor into or out of the circuit, the relay being so organized that in its open circuit position it raises the calibration of the overload member, thus preventing the trip coil from releasing the circuit breaker latch. I further arrange the operating mechanism of the circuit breaker so that the line switch supplying the motor will be closed before the handle or operating element has reached the full limit of its movement.

The various features of novelty will be hereinafter more fully described, and will be definitely pointed out in the claims.

In the accompanying drawing, which illustrates the invention, 1 represents an induction motor, and 2 the automatic circuit breaker for cutting the motor into the circuit.

3, 4, 5 represent the leads from a supply circuit carrying alternating current.

6 represents the trip coil or release magnet of the circuit breaker, this trip coil being in a branch circuit connecting one of the motor leads as 7 with the trip coil and with the points of a switch or bridging contact 8 on the handle of the circuit breaker.

9, 9ª, 9ᵇ, represent each a combined overload and underload relay having an overload armature 10 and an underload armature 11 each provided with a retracting spring as indicated.

12 is a metallic bracket rigidly mounted on the insulating panel 13 in position to form contact through the magnet frame for either the overload or the underload armature. The control circuit for the trip coil 6 is normally open, and may be completed by either of these armatures, the trip circuit including the wire 14 connecting in parallel with the brackets 12 of the several relays, and connecting with one of the contacts bridged by the handle of the circuit breaker.

15 is a wire connecting with one of the motor leads and in parallel relation to the several relay frames.

The armatures 11, when the circuit is open, are in a retracted position, but when the switch elements 2 of the circuit breaker are closed, an air gap in the magnetic circuit of the relay weakens the lifting power and thereby increases the calibration of the overload armature. The underload armature, however, is drawn up so as to close this air gap, thereby improving the magnetic circuit and permitting the circuit breaker to respond to it rated overload. The flexibility of the bridging contacts 16 of the circuit breaker permits a small range of movement for the operating handle after closure of the circuit. Therefore, the trip circuit will be completed at 8, a short interval of time after this motor circuit is closed, and the large starting current will not lift the overload armature 10 as its magnetic circuit is weaker than in running conditions because of the air gap. Thus the motor will not open the breaker, but the magnetic circuit is sufficiently good to draw up the armature 11 and place the relays in proper condition to actuate the overload trips at their proper calibrated load. When the contact is made at 8 the underload armature is against its back-stop, and the circuit of the trip coil is closed through armature 11, but the latter starts on its forward excursion and open-circuits the coil instantly and before the operator can release his grip of the handle, after which the latch of the breaker drops into its seat and holds the breaker closed, and during this interval the overload armature cannot be raised, owing to the high reluctance of its magnetic circuit. If desired, the underload armature may be retarded in forward movement as a small dashpot to produce a longer time limit for the protection. If an overload should occur under running conditions one of the armatures 10, according to the line in which the overload occurs, will be raised, closing the trip circuit and opening the switch which supplies the motor. The circuit may be traced as follows: from line 7, overload trip coil 6, contact 8, conductor 14, any or all relay overload armatures (when raised by overload) relay frame to outside motor leads. If either of the line wires should break, the underload armature corresponding to that line opens and closes the circuit to the trip magnet over the circuit 7, 6, 8, 14 and 15, including the armature of the line affected. In case of failure of voltage on all the lines the motor will supply the tripping current, or, if desired, this trip circuit may be fed from a local source instead of the motor leads.

Having thus described my invention, I declare that what I claim as new and desire to obtain by Letters Patent, is:

1. Means for protecting counter electromotive apparatus, taking a larger starting than running current, comprising a circuit breaker having electro-responsive tripping means and adapted to connect said apparatus with the source of supply, means for operating said tripping means on overload and underload, the said underload operating means preventing operation of said overload operating means by starting current.

2. Protection apparatus for electric motors comprising a circuit breaker having a trip coil and adapted to connect the motor with line, said circuit breaker having its trip coil in a normally open circuit, and overload and underload relay armatures for closing the circuit of the trip coil, the underload armature in its retracted position increasing the reluctance of the magnetic circuit of the overload armature to prevent tripping the circuit breaker under starting load.

3. Means for protecting electric motors comprising a circuit breaker having a trip coil and adapted to connect the motor with line, a normally open circuit including the trip coil, and a combined underload and overload relay in the motor circuit adapted to close the trip circuit of the circuit breaker, said relay having a common magnetic circuit for the overload and underload armatures, the underload armature when retracted producing an air gap in said magnetic circuit to prevent tripping the circuit breaker when the motor is started.

4. Means for protecting electric motors comprising a circuit breaker having a trip coil, a normally open circuit including the trip coil, an overload and underload relay in the motor circuit adapted to close the trip circuit, and an auxiliary switch governed by the circuit breaker for closing the trip circuit when the circuit breaker is cramped into latching position.

5. Means for protecting counter electromotive apparatus, taking a larger starting than running current, comprising a circuit breaker having electro-responsive tripping means and adapted to connect said apparatus with the source of supply, a relay having overload and underload armatures controlling said tripping means, the said underload armature preventing operation of said overload armature by starting current.

6. The combination with a polyphase motor, of a circuit breaker adapted to establish circuits through said motor when closed and to interrupt current therethrough when it is open, said circuit breaker comprising an electro-responsive tripping device, and means for opening said circuit breaker upon overload or underload in any of the phases of said motor, said means comprising a circuit controlling said tripping device and a plurality of relays controlling the last mentioned circuit, said relays being connected to be operated on underload or overload in any phase, each of said relays comprising a coil, an underload armature and an overload armature, the said underload armature preventing operation of the overload armature by starting current.

In testimony whereof I affix my signature, in presence of two witnesses.

GEORGE AUGUSTUS BURNHAM.

Witnesses:
 A. C. NELSON,
 H. W. CALDER.